US006469501B1

(12) United States Patent
Blanke et al.

(10) Patent No.: US 6,469,501 B1
(45) Date of Patent: Oct. 22, 2002

(54) CONDUCTIVE SYSTEM FOR MEASURING THE LINEAR AND ANGULAR POSITIONS OF ONE OBJECT RELATIVE TO ANOTHER

(75) Inventors: Mogens Blanke, Farum (DK); Troels Winther Udsen, Mariager (DK)

(73) Assignee: 3D Sensor ApS, Farum (DK)

( * ) Notice: Subject to any disclaimer, the term of this patent is extended or adjusted under 35 U.S.C. 154(b) by 0 days.

(21) Appl. No.: 09/720,926

(22) PCT Filed: Jun. 30, 1999

(86) PCT No.: PCT/DK99/00370

§ 371 (c)(1),
(2), (4) Date: Dec. 29, 2000

(87) PCT Pub. No.: WO00/02013

PCT Pub. Date: Jan. 13, 2000

(30) Foreign Application Priority Data

Jun. 30, 1998 (DK) .......................................... 1998 00852

(51) Int. Cl.⁷ ................................................. G01B 7/14
(52) U.S. Cl. ............................ 324/207.17; 324/207.24; 324/207.25
(58) Field of Search ....................... 324/207.17, 207.12, 324/207.22, 207.24, 207.23, 207.14; 336/45, 115, 129, 180; 74/471

(56) References Cited

U.S. PATENT DOCUMENTS

| 4,223,300 A | | 9/1980 | Wilkund | |
|---|---|---|---|---|
| 4,361,805 A | | 11/1982 | Narimatsu et al. | |
| 4,378,465 A | | 3/1983 | Green et al. | |
| 4,661,773 A | | 4/1987 | Kawakita et al. | |
| 4,697,144 A | * | 9/1987 | Howbrook | 324/207.24 |
| 4,812,812 A | | 3/1989 | Flowerdew et al. | |
| 5,381,091 A | | 1/1995 | Kobayashi et al. | |
| 5,523,683 A | * | 6/1996 | Okamoto et al. | 324/207.17 |
| 5,530,347 A | | 6/1996 | Heeregh et al. | |
| 5,617,023 A | | 4/1997 | Skalski | |
| 5,646,525 A | | 7/1997 | Gilboa | |
| 5,705,972 A | * | 1/1998 | Ikemoto | 336/129 |

FOREIGN PATENT DOCUMENTS

| DE | 4103603 | 7/1991 |
|---|---|---|
| EP | 0709648 | 1/1996 |
| WO | 9214114 | 8/1992 |

* cited by examiner

Primary Examiner—Edward Lefkowitz
Assistant Examiner—Subhash Zaveri
(74) Attorney, Agent, or Firm—Ladas & Parry (57) ABSTRACT

Position measurement system of the relative position between two objects. The system comprises a first and a second inductive system. The first inductive system comprises a transmitting coil and a first detector, with the attribute that the pattern of conductors that form the coil extends along a longitudinal axis. A second inductive system comprises a second transmitting coil and a second detector, with the attribute that the coil extends essentially in the longitudinal direction. The second trasmitter coil can be realised as a Meander pattern of conductive material, with return path in its center-line. Using the detectors, it is possible to accurately determine the linear and/or angular position(s) of two bodies relative to each other.

16 Claims, 6 Drawing Sheets

CONDUCTIVE SYSTEM FOR MEASURING THE LINEAR AND ANGULAR POSITIONS OF ONE OBJECT RELATIVE TO ANOTHER

This invention is concerned with a system for the measurement of linear and angular positions of one object relative to another, comprising a first inductive system that consists of a first transmitting coil and a first detector; a second inductive system that consists of a second coil and a second detector, wherein the said first transmitting coil has conductive elements arranged in a geometry such that displacement along one axis will change the magnetic flux through a selected area in a predetermined way, whereas the flux through the said area will remain essentially unchanged when the displacement is perpendicular to the said axis. Two or more sets of transmitter coils and detectors are used to sense displacement in several dimensions.

An electromagnetic system for the measurement of relative positions is a transducer that will convert a relative physical position and angular rotation between two bodies to a signal that can be interpreted as their relative position and rotation. Transducers for linear and angular position are applied in a multitude of technical and mechanical devices. In the following this will be referred to as a position measurement system.

A position measurement system is concerned with two objects which are movable relative to each other and for which the relative linear and or angular positions shall be determined. Each of the two objects will have components that can generate and/or detect an electromagnetic field. By generating an electromagnetic field at one object that has an predetermined spatial variation, detection at the other object will make it possible to record pairs of related values of electromagnetic flux and the relative position of the two objects. Detection of the magnetic flux thus makes it possible to determine said position between the two objects. The accuracy with which this can be accomplished depends on how well this relation can be established. As a general observation, the transmitted field could be generated in close proximity to the place of detection to avoid disturbances from other electromagnetic fields, including the Geomagnetic field.

Applications of position measurement systems include measurement of rotation about one or more axes and/or measurement of linear displacement in one or more dimensions. Some position measurement systems are generally applicable, others are dedicated to the measurement of eg rotation about one axis or linear displacement in one dimension.

In connection with measurement of more advanced patterns of relative motion, ie relative position and/or rotation in more than one degree of freedom, a trade-off must usually be made where accuracy is significantly reduced to obtain measurement in more than one degree of freedom. This is caused by mechanical limitations to the layout of transmitter and detector elements for measurement in two or three dimensional structures. The result is that a high accuracy can usually not be achieved.

U.S. Pat. No 5,523,683 describes an induction sensor to measure the displacement of one body relative to another using electromagnetic induction. The paper describes a scaler and a slider, each made as hollow cylinders on each of which a coil is constructed as a set of conductors. The induction sensor measures linear displacement along said cylinder, with the coils generating a field that is essentially varying along the axis of the cylinder, with the exception of a stray component from feed and return conductors axially on the cylinder. The transmitter and receiver coils are made as geometrically equivalent in a pattern to make it insensitive to any other motion than the desired linear displacement.

This induction sensor is thus capable of measuring linear displacement only and is insensitive to scaler and slider being rotated at an angle relative to each other.

GB patent application No 2,095,840 describes a system for the determination of position information based on magnetic induction. This system comprises a permanent magnet and magneto-sensitive semiconductor devices located around the permanent magnet.

This system has the drawback that the magnetic field is constant over time and thus rather sensitive to other magnetic fields, including the geomagnetic field and fields from magnetised objects. The geometry of this system is not made to compensate for such disturbances.

GB patent application Nom 2,197,078 describes a system for the determination of relative positions comprising a transmitter and a receiver. The transmitter comprises three coils arranged along orthogonal axes. The coils are driven pairwise by an alternating current, resulting in a field that rotates about the axis of the second coil. This field is detected using the receiver which can be a coil. The induced voltage in the coil can then be related to the position of the receiver relative to the transmitter. The receiver can comprise three orthogonal coils.

This system is not always useful since the achievable accuracy depends on the distribution of conductive material in proximity to receiver and transmitter. Furthermore, the geometry of the electromagnetic field is relatively complex which hinders a very accurate determination of position.

It is thus a difficulty with known electromagnetic position measurement systems to determine the position of an object in more than one degree of freedom in that the mechanical construction causes the generated electromagnetic field to have a complexity that in practice hinders the detection of the field such that the detected signals can be used for precise determination of relative position. It is a further obstacle that existing solutions do not make it possible to determine the achievable accuracy through simple geometry of the mechanical construction of the sensing device.

One purpose of the present invention is therefore to provide a position measurement system which can establish an electromagnetic field that can be precisely detected and uniformly in at least two degrees of freedom and with a desired accuracy.

This is achieved by constructing the aforementioned position measurement system such that the second transmitting coil comprises electrical conductors arranged in an essentially parallel way, which extend in a direction perpendicular to the axis in which a displacement is desired to be sensed, and distributed along the axis such that a second electromagnetic component can be established perpendicular to the said axis. The conductive elements are arranged in a geometry such that displacement along the said axis will change the magnetic flux through a selected area in a predetermined way, whereas the flux through said area will remain essentially unchanged when the displacement is perpendicular to the axis. Two or more sets of transmitter coils and detectors are used to sense displacement in two or three dimensions.

Conductor elements can be distributed along the said axis and a desired accuracy can be obtained using commonplace design. The result is a position measurement system that can establish a well-defined electromagnetic field, that can be easily detected and has a spatial variation along two or more orthogonal axes.

In a preferred embodiment the first transmitter coil comprises a second conductor element which is essentially parallel with the first conductor element. This enables an increase of the transmitted field strength.

In a specifically preferred embodiment, the first and second conductor elements have sufficient separation for current through the conductors generates (to generate) an electromagnetic field that can be detected with the first detector. This makes it possible to generate a well defined, spatially varying electromagnetic field in a desired region around the object.

A very compact geometry can be obtained when the first transmitting coil is ring-shaped.

In a particular form, the conductor elements in the second transmitter coil are connected to make a conductive pattern around a mid-line. The pattern can then be made according to a desired geometry of the detector such that a position dependent signal can be generated with desired properties.

In a particular form, the second transmitter coil is given a Meander pattern with the mid-line as axis of symmetry. A Meander coil has a periodically repeated pattern that can be repeated along its longitudinal axis and thus give a uniform longitudinal detectability along the entire coil. The return current is led through a conductor at the said mid-line, thus shaping the electromagnetic components as desired along as well as perpendicular to the longitudinal direction.

In another form, the first detector has a geometry that overlaps the first transmitting coil perpendicular to the longitudinal direction, such that a signal is generated that is sensitive to displacement perpendicular to the longitudinal direction while the signal is insensitive to displacement along the longitudinal axis. The detector can thus detect a position displacement perpendicular to the longitudinal axis, while the detector is also displaced along the longitudinal axis.

In a particular embodiment, the first detector comprises a first and a second detector coil that are overlapping with half a coil-width. This makes it possible to generate two redundant position signals, of which one detects a maximum when the other detects a minimum in flux. This can be used to achieve fault-tolerance of the sensor and also to enhance the detection accuracy. In addition, this makes detection insensitive to distance between the transmitter and detector coils.

In a particular embodiment, the second detector has a geometry that overlaps the second transmitter coil in a direction perpendicular to the longitudinal axis to enable generation of a position signal that is a function of the longitudinal displacement, but insensitive to displacement in the perpendicular direction.

In a further embodiment, the second detector comprises a third and a fourth detector coil which are overlapping with half a coil-width. Again, this makes it possible to obtain two position signals to yield enhanced accuracy of detection and ability to make a fault-tolerant construction. In addition, this makes detection insensitive to distance between the transmitter and detector coils.

In a further embodiment, the first transmitter coil is driven by a first electrical signal, the second by a second electrical signal, such that the electromagnetic fields generated by the two transmitter coils can be distinguished from each other. This is used for both discrimination in the detectors and for elimination of electromagnetic disturbances.

In a further embodiment, the first and second transmitter-coils are mounted on a surface. This makes the coil construction very compact in a direction perpendicular to the said surface.

In a form where the said surface has the shape of a cylinder or a section thereof, the first and/or the second detector is mounted on a double-curved, eg a spherical surface. This construction allows to maintain an essentially constant distance between transmitter and detector coils when turning or displacing the objects relative to each other. Although not required for the proper function, this will reduce effects of disturbing magnetic fields.

The invention is explained below with reference to the drawings, wherein.

Figure 1:
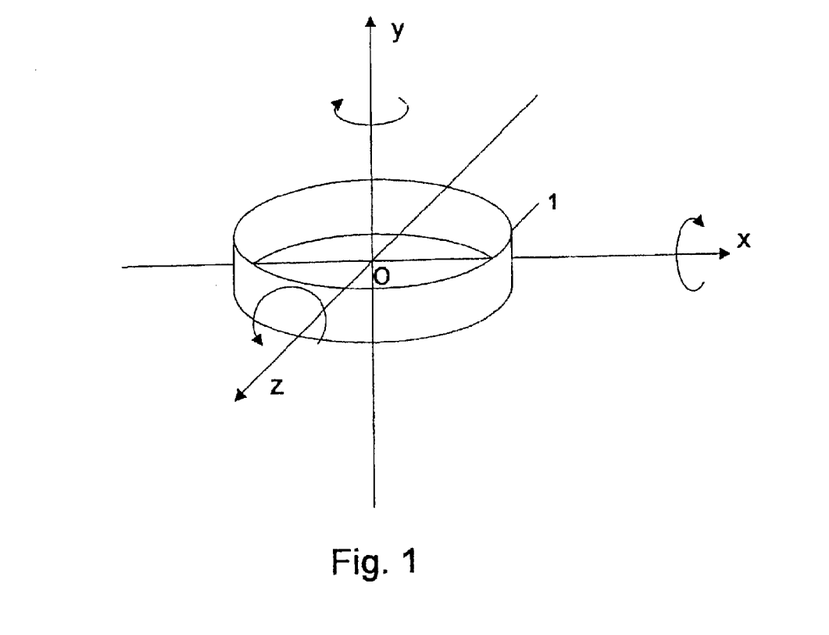
FIG. 1 shows a cylinder in a three-dimensional system of co-ordinates.

FIG. 1 shows a cylinder ring in a three dimensional system of co-ordinates. The system of co-ordinates has an origo and three orthogonal axes, x, y and z. The cylinder ring can turn about the y and either or both of the x or z axes. Alternatively it can turn about y, rotate around x and/or z while also being displaced along y.

The cylinder ring is in the following used to illustrate the position of the first object relative to the second. The objects are not shown. The first object is connected with the cylinder ring, the second is fixed with the system of co-ordinates.

Figure 2:
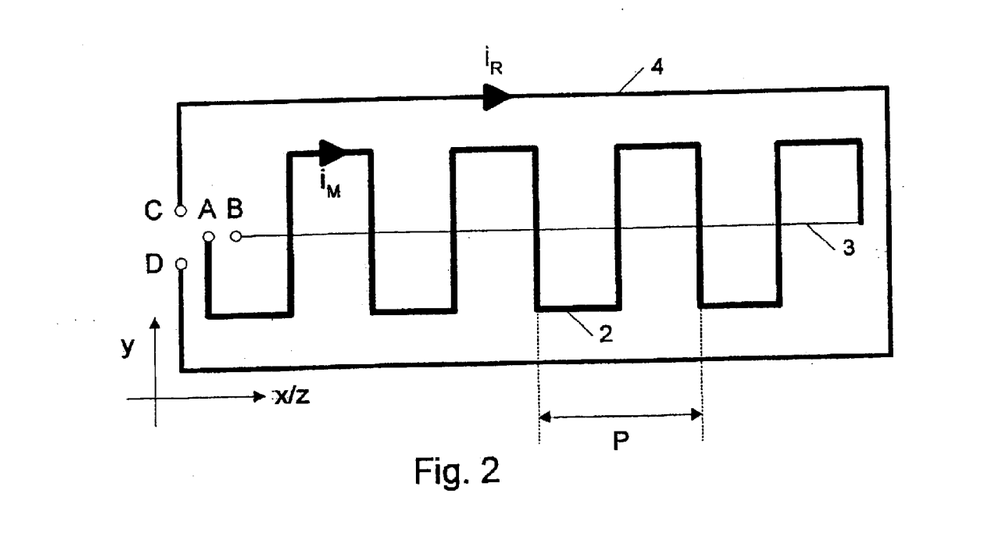
FIG. 2 shows a Meander-coil and a ring-coil.

FIG. 2 shows a Meander coil and a ring coil. The Meander coils comprise a conductor in a Meander pattern 2 and a return conductor 3. The Meander shaped conductor is at one end terminated in A, in the other to the return conductor. The return conductor 3 is, in turn, connected to the Meander conductor and terminated in B. The return and the Meander conductors are mutually insulated, except for the one connection point. The Meander pattern has a number of Meander periods of length P, which is considered 360 Meander degrees or two half periods of 180 Meander degrees.

The ring coil comprises a ring-shaped conductor 4, which in each end is terminated in C and D. The ring coil is made to encompass the Meander coil and be electrically insulated from it.

The system of co-ordinates with the vertical y-axis and horizontal x- and z-axes show the orientation of the ring coil and the Meander coil.

The Meander and the ring coils have each an appropriate geometry as a coil system, to enable a well-defined spatial electromagnetic field. When the field is measured with an appropriate detector, it is possible to determine the position-relation by use of the detector. In the following, a particular embodiment is considered where the cylinder ring 1 is mounted on a moving object. The Meander and ring coils are mounted on the surface of the cylinder ring 1, and the y-axes of the two bodies are parallel in a neutral position.

A first electrical current $i_M$ will flow through the Meander-coil when terminals A and B are connected to an appropriate source. The current creates an electromagnetic field around the conductors in the Meander coil. The field from the vertical conductor parts gives a total field component from the Meander that varies along the x-z plane. This component is used to detect rotation about the y-axis. The electromagnetic field from the horizontal conductors of the Meander gives rise to undesired component of the field, but with the return conductor placed in the mid-line of the Meander, the components from the return conductor and the horizontal parts will essentially give a zero component, since the orientation of these conductors are the same while they carry the same current but in opposite directions.

When the ring coil is connected via C and D to an electrical source, the current $i_R$ will flow and an associated electromagnetic field will be generated. The field from horizontal parts of the coil creates a field component that varies along the y direction while, in turn, is invariant to rotation of the cylinder ring. This component is used for detection of rotation of the cylinder ring 1 around the x-axis and/or the z-axis, or for displacement along y. The electromagnetic field from the vertical conductor parts gives rise to undesired components of the field, but when the ring-coil spans exactly the entire circumference of the cylinder ring, the vertical parts of the coil can be placed isolated, but on top of each other such that the field disturbance from these parts will essentially cancel each other.

In a practical embodiment, the termination points are placed as close as possible, if coils are made as conductive patterns on a flexible multi-layer printed circuit board, termination points can made to overlap without electrical short-circuiting This effectively minimises termination effects.

Figure 3:
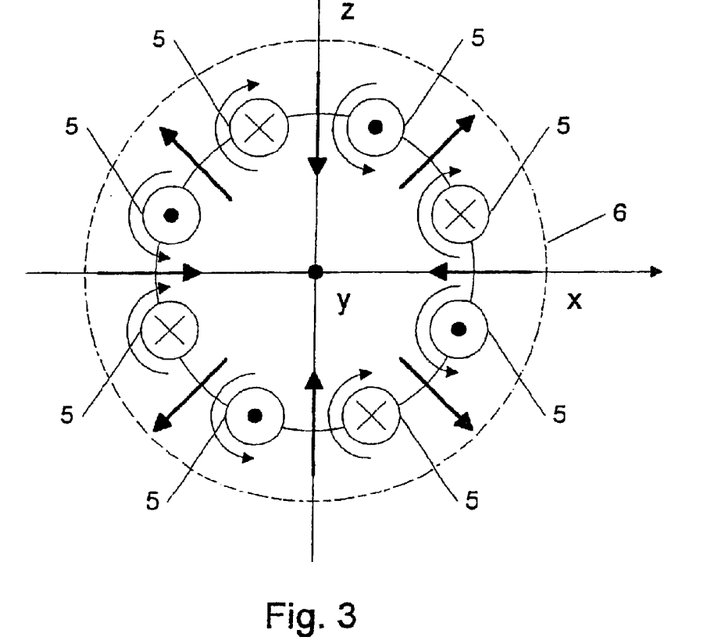
FIG. 3 is a sectional view through a number of electrical conductors that carry a current and thus generate an electromagnetic field.

FIG. 3 shows a cross section through a number of conductors and the associated magnetic field. The field corresponds to that established by the vertical conductors in the Meander 2 that is mounted on the cylinder 1. The cross section is seen in the x/z plane. The conductors 5 carry a current $i_M$ shown as an x when the current is in the negative y direction. A dot indicates current out of the x/z plane in positive y direction. The direction of the magnetic field is illustrated by arrows.

The figure shows that along the circle 6, in the x/z plane and centered at the y axis, there is established a electromagnetic field that varies in a well-defined way as a function of the spatial position along the circle.

Figure 4:
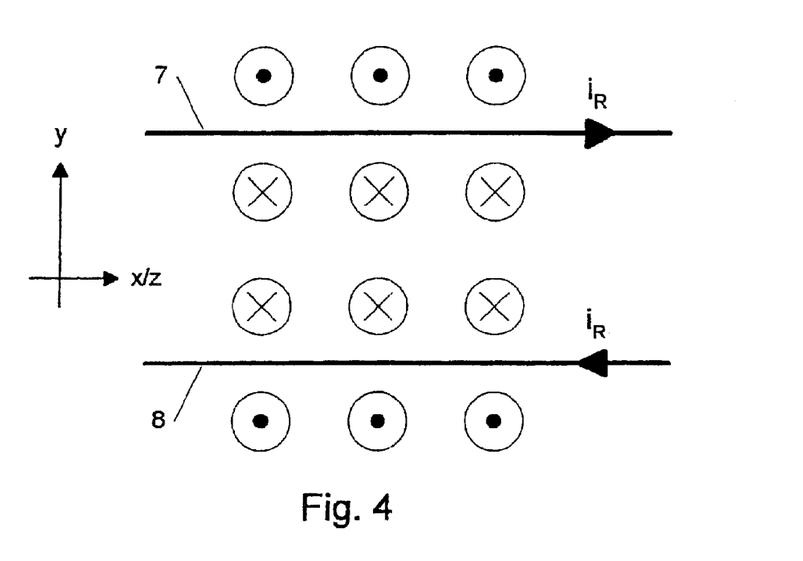
FIG. 4 is a sectional view of two parallel conductors carrying a current and the thus generated electromagnetic field.

FIG. 4 shows a section of two parallel conductors carrying a current and generating an associated electromagnetic field. This illustrates the field generated by a current $i_R$ in the conductors 7 and 8 in the ring coil 4. The generated field is shown as arrows, an x indicates direction perpendicular into the cut, a dot perpendicular out of the cut. There is hence established an electromagnetic field that varies in a well-defined way as a function of the spatial position along the y-axis while it is constant for a rotation around the y-axis.

Figure 5A:
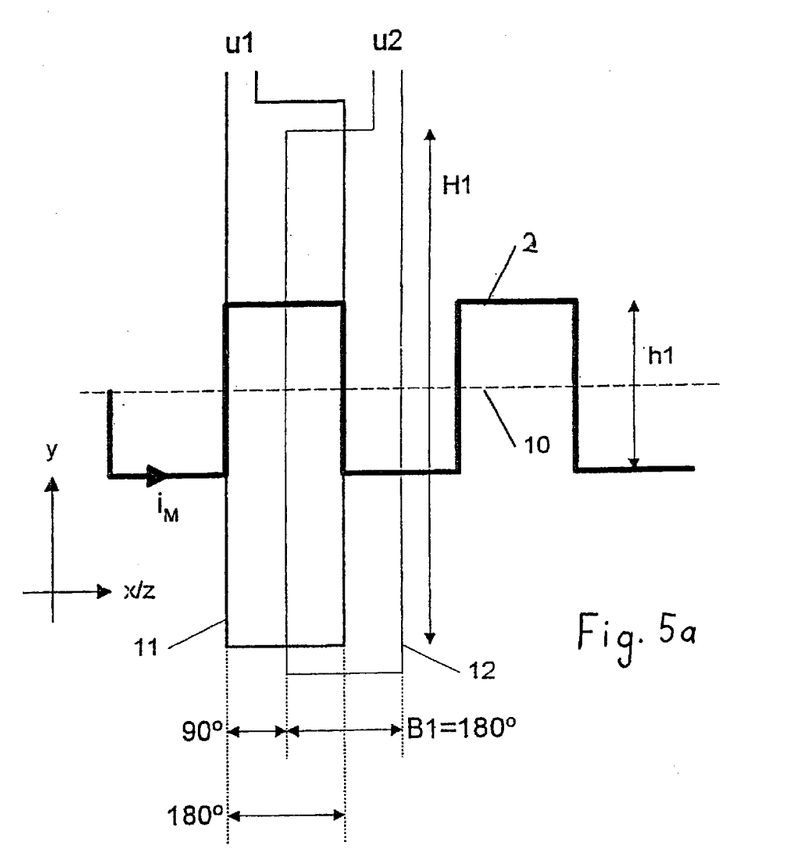
FIG. 5 is a sectional view of the Meander-coil and a detector with position signals in a detector made with two coils.
Figure 5B:
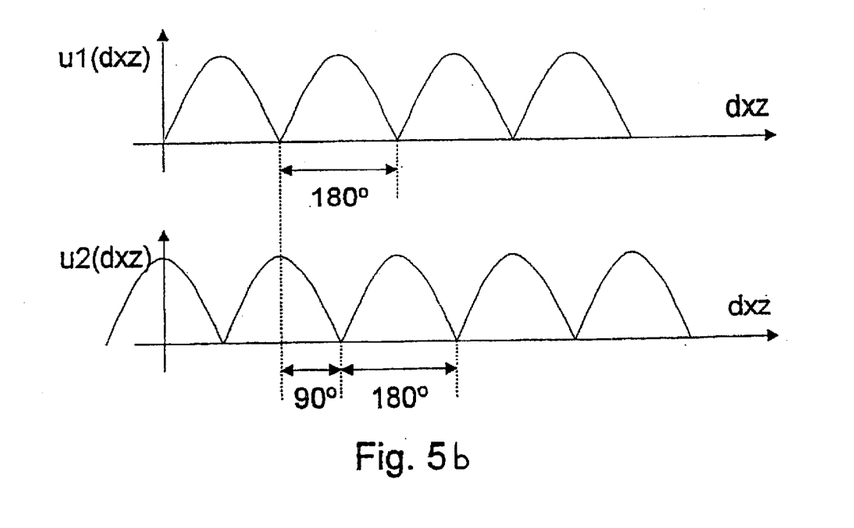

FIG. 5 shows a section of the Meander coil and a detector, and the position signals. The conductor 9 has a centerline 10 and a geometric form with an extension h1 along the y axis and B1 along the x/z axis. On the figure, B1 has an extension of 180 Meander degrees. The coils 11 and 12 are displaced relative to each other along the x/z axis by 90 Meander degrees.

When a current flows in the conductor 2, a voltage u1 is induced in the coil 11 and a voltage u2 is induced in the coil 12. The voltages u1 and u2 will depend on the relative displacement along the x/z axis, dxz, of the coils and the conductive elements. Voltages u1 and u2 will, however, be invariant against a bounded, relative displacement along the y axis since h1 is less than H1. This means that by placing the coils 11 and 12 in close proximity to the surface of the cylinder 1, it is possible to detect a rotation of the cylinder 1 about the y axis despite this has also had a bounded rotation around another axis or a displacement along the y axis.

The voltages u1 and u2 are functions of the relative displacement dxz between the Meander coil and the coil 11 and the coil 12, respectively. With the coils 11 and 12 displaced by 90 Meander degrees, the phase angle between of u1 and u2 have a similar difference.

If the current $i_M$ is a direct current (DC), the induced voltage in the coils 11 and 12 will be approximately sine and cosine of the displacement d, when B1 is chosen to be equivalent to 180 Median degrees. In a practical embodiment, alternating current will be chosen for $i_M$ and the u1 and u2 signals will be amplitude modulated according to the absolute value of the said functions of the displacement. Standard techniques are used to de-modulate the displacement information and eliminate disturbances from other sources.

Figure 6A:
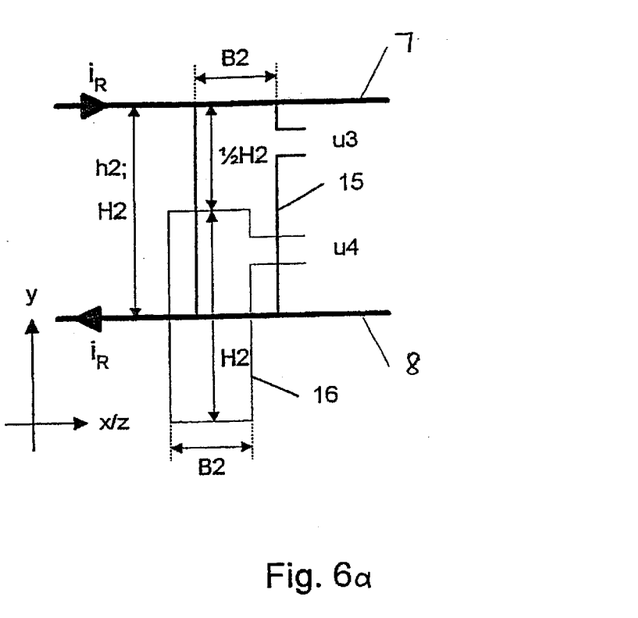
FIG. 6 shows two parallel conductors and a detector in the embodiment with two detector coils, and the position signals associated with a displacement.
Figure 6B:
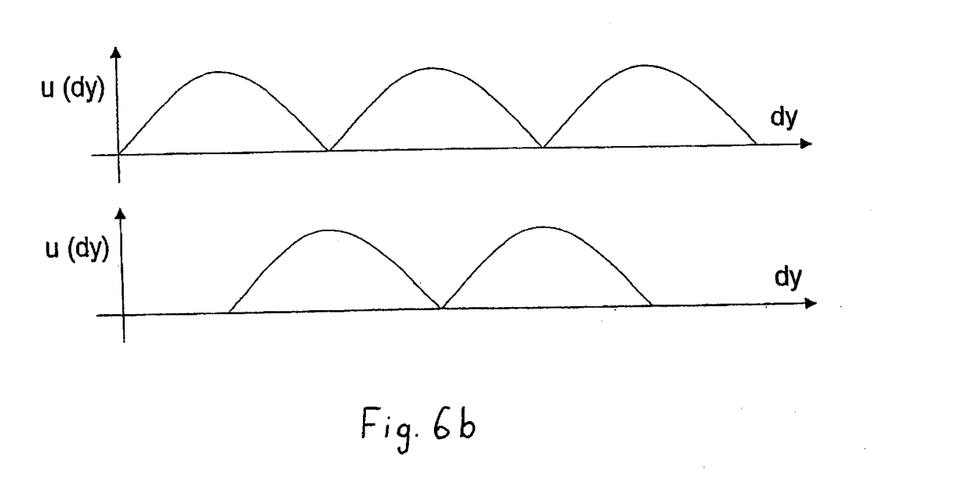

FIG. 6 shows two parallel conductors, detector and position signals. The two conductors 13 and 14 are parallel and have a distance of h2. The coils 15 and 16 have a geometrical form with extension H2 along the y-axis and B2 along the x-z axis.

When a current $i_R$ flows through conductors 7 and 8, a voltage u3 is induced in the coil 15 and a voltage u4 in 16. The voltages u3 and u4 will depend on the relative displacement along the y-axis, dy, between the coils and the conductor. The voltages u3 and u4 will, however, be invariant against a relative displacement dxz along the x-z axis, between the coils and the conductor. With detector coils 15 and 16 placed in close proximity to the surface of the cylinder 1, it is thus possible to detect rotation of the cylinder 1 around the x and/or z-axes, independent of the rotation of the cylinder around the y-axis.

The voltages u3 and u4 are functions of the relative displacement dy between the ring coil and the coils 15 and 16, respectively. With 15 and 16 given a relative displacement by ½H2=h2, voltages u3 and u4 have a difference in phase angle, such that one has a maximum when the other has its minimum.

If using a DC current for $i_R$ induced voltages in coils 15 and 16 will be approximately sine- and cosine functions of the displacement dy if H2 is chosen to equal the distance h2 between conductors 7 and 8.

Practical implementation will use a modulated (AC) signal in the ring coil and detection techniques to isolate the two signal envelopes which constitute the position signals. The modulation type and frequency must be chosen from the maximum relative velocities of the detection coils relative to the transmitter coils using well known calculation techniques.

Figure 7:
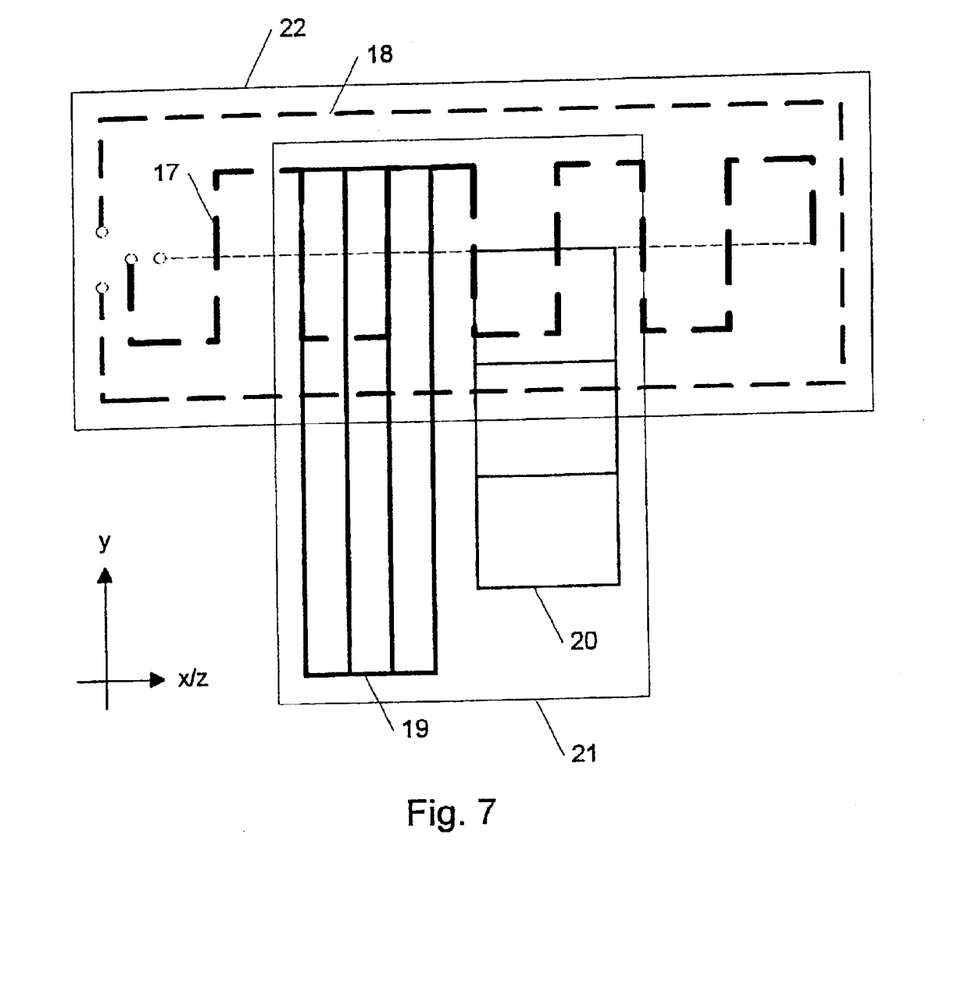
FIG. 7 shows two detectors and their positions relative to the Meander and ring coils.

FIG. 7 shows two detedtors relative to a ring coil and a Meander coil. The ring coil 4 and the Meander coil 2 are shown in dotted line, representing the ring coil 4 and the Meander coil 2 in FIG. 2. The detector 19 comprises two detector coils, like 11 and 12. The detector 20 likewise comprises two coils, like 15 and 16. In order to distinguish the signals from the ring and Meander coils, respectively, it is preferred to drive these coils from separate sources, using electrical excitation waveforms that enable separation of the two signals at the detector side. Several excitation waveforms can be used, including but not limited to pure sinusoidal at different frequencies, narrow band with adequate frequency separation, and spread spectrum with adequate coding.

Figure 8:
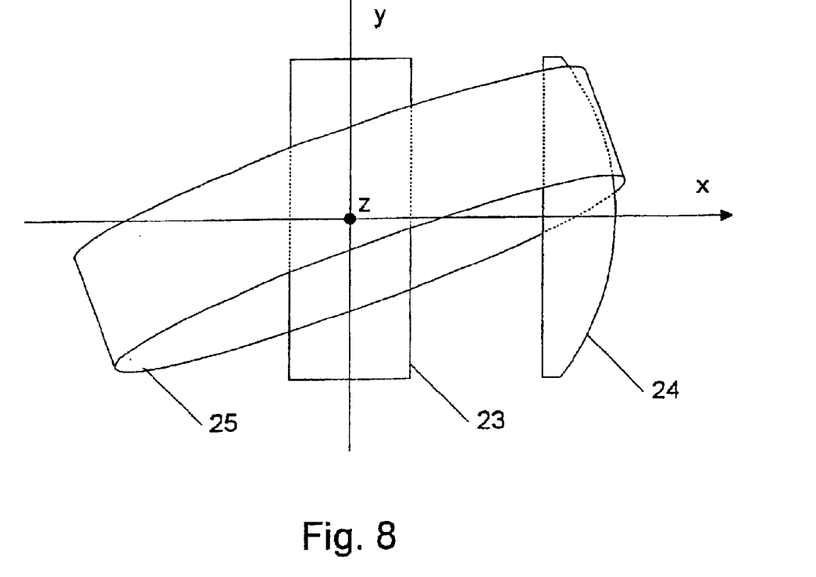
FIG. 8 shows a cylinder tilted around a z-axis and an x-axis and two detector-mounts.

FIG. 8 shows a cylinder, which is rotated relative to the two detectors, around a z-axis and an x-axis. This embodiment comprises two detector mounts 23 and 24 to enable measurement of rotations around the x-axis, the y-axis, and the z-axis. At least one of the detector mounts 23 or 24 shall comprise a detector, equivalent to the detector 19, to enable measurement of rotation around the y-axis. Rotation around both of x- and z-axes can be measured when both detector mounts comprise a detector equivalent to 20.

Figure 9:
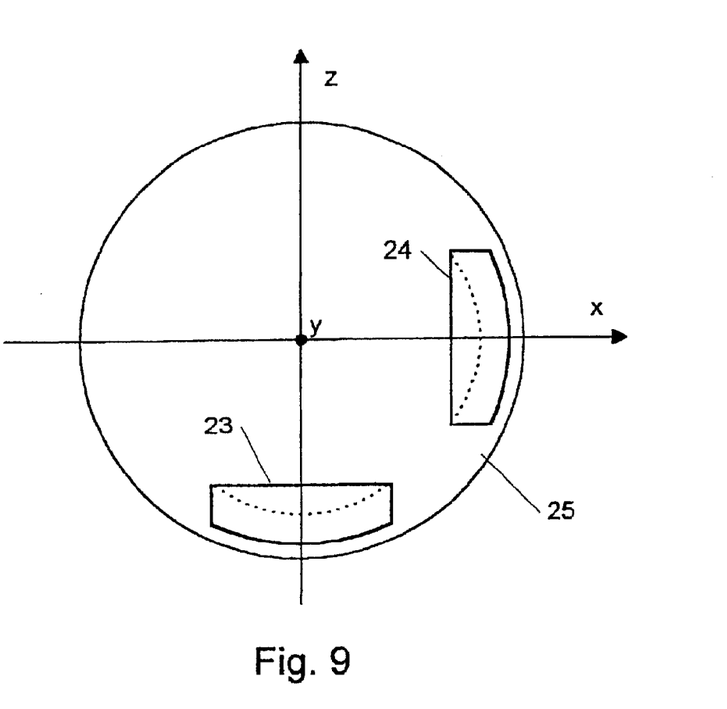
FIG. 9 shown the locations of two detector-mounts relative to a cylinder ring in normal position.

FIG. 9 shows the location of two detectors relative to a cylinder in normal position. Normal position is understood as the position of the cylinder where it is not rotated or displaced with respect to a system of coordinates defined in FIG. 1. Detectors 23 and 24 are mounted in close proximity to the inside of the cylinder 1. This is a preferred embodiment, although an outside mounting would work equally well.

The above description shows how the invention can be used for relative displacement, that is a measurement of position within one period of the Meander coil. In cases where absolute position of the Meander coil is needed, a second Meander coil system is established using a geometry with a different number of Meander periods in the first and second Meander coil. The combination of the two measurements will enable the resolution of absolute position.

With a first Meander of length L and N Meander periods, the relative position signal $x_1$ is related to absolute position as $$x = (x_1 + n_1)\frac{L}{N}$$

where $n_1$ is an integer number in the closed interval from 0 to N−1, $n_1$ being the Meander period. With a second Meander coil, with M periods, the absolute position is $$x = (x_2 + n_2)\frac{L}{M}$$

and the period count is $n_2$, an integer number in the closed interval from 0 to M−1.

Given $x_1$ and $x_2$, L, N and MN these equations can be solved and the absolute position x be determined. It is a prerequisite that the design parameters N and M have no common divisors.

In the position measurement system as described in this invention, the implication is that absolute position measurement can be made in all degrees of freedom considered, provided a second Meander coil is included.

In an implementation based on multi-.layer printed circuit board (PCB) technology, the Meander coils could conveniently be implemented in separate PCB layers.

The above mentioned excitation principles should likewise be applied for a double meander coil arrangement to enable convenient detection of absolute position.

What is claimed is:

1. A system for measurement of the positioning of a first object relative to a second object, where said measurement is performed for at least two degrees of freedom simultaneously, wherein said first object comprises at least a first and a second transmitter coil that are electrically conducting, where said first transmitter coil is driven by a first electric current to produce a first magnetic flux, which is varying in time, and said second transmitter coil is driven by a second electric current to produce a second magnetic flux, which is varying in time, wherein said second object comprises at least a first and a second detector, where said first detector comprises a first detector coil and is operable to detect time varying magnetic flux through that first detector coil, and where said second detector has a second detector coil and is operable to detect time varying magnetic flux through that second detector coil, said first and said second detector coils being electrically conducting, wherein measurement of said first magnetic flux with said first detector is indicative of a first component of said positioning of said first object relative to said second object, said first component pertaining to a first direction wherein measurement of said second magnetic flux with said second detector is indicative of a second component of said positioning of said first object relative to said second object, said second component pertaining to a second direction perpendicular to said first direction, wherein said first magnetic flux is varying spatially in an alternating manner along said first direction, said second magnetic flux is varying spatially in an alternating manner with a certain periodicity along said second direction.

2. A system according to claim 1 wherein said second direction is a rotational direction around an axis parallel with said first direction, where said rotational direction corresponds to a first of said at least two degrees of freedom.

3. A system according to claim 1 wherein said first direction comprises a translational direction along said second axis.

4. A system according to claim 2 wherein said first direction comprises a rotational direction around a first axis, where said first axis is perpendicular to said second axis and parallel to the plane of the winding of said first detector coil.

5. A system according to claim 2 wherein said system comprises a third detector with a third electrically conducting detector coil that is perpendicular to said first detector coil, said detector being operable to detect magnetic flux through that third detector coil, where measurement of said first magnetic flux with said third detector is indicative of a third component of said positioning, said third component pertaining to a third direction, where said third direction comprises a translational direction along said second axis and/or a rotational direction around a third axis, where said third axis is perpendicular to said first and second axis.

6. A system according to claim 1 wherein said first magnetic flux due to said first electric current and said second magnetic flux due to said second electric current are mutually distinguishable due to differences between said first and said second electric current, where said differences are at least one from the group consisting of different frequencies and different modulations.

7. A system according to claim 1 wherein said first transmitter coil has at least two parallel first conductor sections, said parallel first conductor sections being perpendicular to said first direction, wherein the direction of said first electric current in said parallel first conductor sections is alternating for subsequent parallel first conductor sections.

8. A system according to claim 1 wherein said second transmitter coil has at least two parallel second conductor sections, said parallel second conductor sections being perpendicular to said second direction, wherein the direction of said second electric current in said second conductor sections is alternating for subsequent sections.

9. A system according claim 8 wherein said second transmitter coil is a Meander coil with a central conductor extending parallel with said second direction, said second electric current in said sentral conductor producing a further magnetic flux counteracting the magnetic flux produced by further conductor sections, where said further conductor sections connect said parallel second conductor sections in said Meander coil.

10. A system according to claim 1 wherein said second detector coil has a width not larger than half a period of said certain periodicity and a length substantially longer than the lengths of said parallel second conductor sections.

11. A system according to claim 1 wherein said second detector comprises at least one further detector coil, where this at least one further detector coil has an orientation and shape substantially equal to the orientation and shape of said second detector coil, and where the center of said at least one further detector coil as compared to the center of said second detector coil is displaced along said second direction by a fractional amount of the period of said certain periodicity.

12. A system according to claim 11 wherein said second detector comprises two coils, the centers of which having a mutual displacement of half a period of said certain periodicity.

13. A system according to claim 1 wherein said first detector comprises at least one additional coil, where said at least one additional coil has an orientation and shape substantially equal to the orientation and shape of said first detector coil and where the center of said at least one additional detector coil as compared to the center of said first detector coil is displaced along the first direction.

14. A system according to claim 13 wherein the center of said at least one additional detector coil is displaced by a distance equal to half the distance between said parallel first detector sections.

15. A system according to claim 1 wherein said system comprises a third transmitter coil that is electrically conducting, where said third transmitter coil is driven by a third electric current to produce a third magnetic flux, which is varying in time and alternating spatially with a further periodicity along said second direction.

16. A system according to claim 15 wherein said further periodicity is different from said certain periodicity by a rational fraction of the period of said certain periodicity.

* * * * *